US010516544B2

(12) United States Patent
Moreno et al.

(10) Patent No.: US 10,516,544 B2
(45) Date of Patent: Dec. 24, 2019

(54) EXTRANET CONNECTIVITY IN LISP NETWORKS

(71) Applicant: CISCO TECHNOLOGY, INC., San Jose, CA (US)

(72) Inventors: Victor Manuel Moreno, Carlsbad, CA (US); Shyam Kapadia, San Jose, CA (US); Sanjay Kumar Hooda, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 119 days.

(21) Appl. No.: 15/649,479

(22) Filed: Jul. 13, 2017

(65) Prior Publication Data
US 2019/0020489 A1 Jan. 17, 2019

(51) Int. Cl.
*G06F 17/30* (2006.01)
*H04L 29/12* (2006.01)
*H04L 12/18* (2006.01)
*H04L 29/06* (2006.01)
*H04L 12/46* (2006.01)
*H04L 12/24* (2006.01)
*H04L 12/733* (2013.01)
*H04L 12/761* (2013.01)

(52) U.S. Cl.
CPC .......... *H04L 12/18* (2013.01); *H04L 12/4633* (2013.01); *H04L 69/03* (2013.01); *H04L 41/0893* (2013.01); *H04L 45/16* (2013.01); *H04L 45/20* (2013.01)

(58) Field of Classification Search
CPC ... H04L 61/103; H04L 61/2084; H04L 45/02; H04L 45/74; G06F 17/30917; G06F 16/86; G06F 15/17; H04W 12/00518
USPC ........................................................ 370/390
See application file for complete search history.

(56) References Cited

U.S. PATENT DOCUMENTS

| | | | | |
|---|---|---|---|---|
| 9,467,398 | B2* | 10/2016 | Miller | H04L 41/0803 |
| 9,559,952 | B2* | 1/2017 | Kapadia | H04L 45/741 |
| 2013/0198369 | A1* | 8/2013 | Kim | H04L 61/103 |
| | | | | 709/224 |
| 2014/0143428 | A1* | 5/2014 | Zheng | H04W 12/08 |
| | | | | 709/226 |
| 2015/0236944 | A1* | 8/2015 | Kano | H04L 45/122 |
| | | | | 370/401 |
| 2016/0065531 | A1* | 3/2016 | Xiaopu | H04L 61/103 |
| | | | | 709/238 |

(Continued)

*Primary Examiner* — Edan Orgad
*Assistant Examiner* — Vanneilian Lalchinthang

(57) ABSTRACT

A Location/Identifier Separation Protocol (LISP) mapping server, including: a network interface for communicating with a LISP-enabled network; a mapping database; an extranet policy table; and a shared subnetwork mapping engine (SSME), including at least a hardware platform, configured to: receive a map request from a first endpoint serviced by a first xTR, the first endpoint on a first subnetwork, the map request for a second endpoint; determine that the second endpoint is not a member of the first subnetwork; query the extranet policy table to identify a second subnetwork that the first subnetwork subscribes to, and to determine that the second endpoint is a member of the second subnetwork; and provide to the first subnetwork a routing locator (RLOC) of an xTR servicing the second endpoint.

20 Claims, 9 Drawing Sheets

(56) References Cited

U.S. PATENT DOCUMENTS

| | | | |
|---|---|---|---|
| 2016/0380823 A1* | 12/2016 | Shen | H04L 12/4675 370/254 |
| 2017/0126496 A1* | 5/2017 | Sikand | H04L 41/0813 |
| 2017/0316106 A1* | 11/2017 | Pillay-Esnault | H04L 61/103 |
| 2018/0039505 A1* | 2/2018 | Lin | H04L 29/02 |
| 2018/0139133 A1* | 5/2018 | Makhijani | H04L 61/106 |

* cited by examiner

EXTRANET CONNECTIVITY IN LISP NETWORKS

FIELD OF THE SPECIFICATION

This disclosure relates in general to the field of computer networking, and more particularly, though not exclusively, to a system and method for extranet connectivity in LISP networks.

BACKGROUND

Locator/ID Separation Protocol (LISP) is a mapping protocol that enables endpoints located in different subnetworks to communicate with one another by encapsulating packets and mapping them to an appropriate subnetwork.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
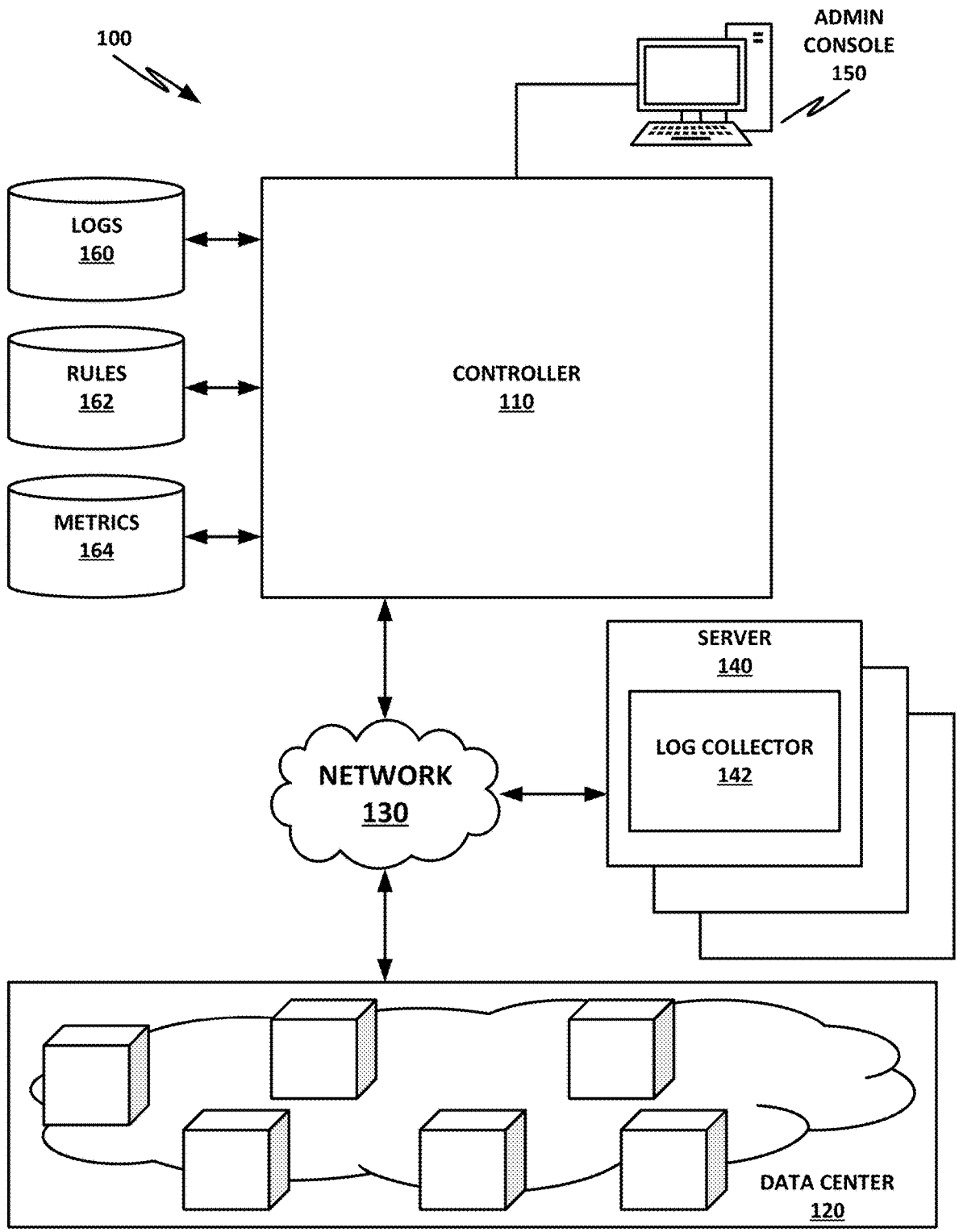
FIG. 1 is a block diagram of a cloud ecosystem according to one or more examples of the present specification.

In an example, there is disclosed a computing system, including: a Location/Identifier Separation Protocol (LISP) mapping server, including: a network interface for communicating with a LISP-enabled network; a mapping database; an extranet policy table; and a shared subnetwork mapping engine (SSME), including at least a hardware platform, configured to: receive a map request from a first endpoint serviced by a first xTR, the first endpoint on a first subnetwork, the map request for a second endpoint; determine that the second endpoint is not a member of the first subnetwork; query the extranet policy table to identify a second subnetwork that the first subnetwork subscribes to, and to determine that the second endpoint is a member of the second subnetwork; and provide to the first subnetwork a routing locator (RLOC) of an xTR servicing the second endpoint.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Furthermore, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

LISP is a protocol that enables endpoints located in different subnetworks to be able to communicate with one another. Absent LISP or a suitable replacement, endpoints on the 10.1/16 subnetwork, for example, would not be able to communicate with endpoints on the 10.2/16 subnetwork (for instance, because the EIDs are not routable within the WAN, e.g., they could be private IP space).

To enable this communication, LISP provides both mapping and encapsulation protocols for endpoint traffic. For example, a LISP deployment may include a mapping server that maps endpoints in a particular subnetwork to a routing locator (RLOC) that services the subnetwork. Communication between the endpoints then occurs via a series of ingress tunneling routers (ITR) and egress tunneling routers (ETR), which may be referred to generically as an xTR. In some embodiments, the ETR and ITR may be collocated on the same hardware, while in other embodiments, they may be provided by different hardware. Individual endpoints sitting behind an xTR may be identified by an endpoint identifier (EID).

By way of example, an endpoint at EID 10.1.0.1/32 may want to communicate with an endpoint at 10.2.0.1/32. The endpoint at 10.1.0.1/32 sends a network packet out to the ITR servicing the 10.1/16 subnetwork with a destination IP address of 10.2.0.1. The ITR then queries the mapping server to identify an RLOC for 10.2.0.1/32. The mapping server queries its mapping database and finds that the 10.2/16 subnetwork is serviced by a particular ETR with an associated RLOC. The mapping server then responds to the ITR with the RLOC for the ETR servicing the 10.2/16 subnetwork.

The ITR servicing the 10.1/16 network encapsulates the EID header with a LISP header and RLOC header for the specific destination node around the regular TCP/IP header, in this case 10.2.0.1/32. The ITR then routes the packet to the ETR servicing the 10.2/16 subnetwork.

When the ETR servicing 10.2/16 receives the encapsulated LISP packet, it decapsulates the packet and forwards it to the appropriate EID, in this case 10.2.0.1/32.

If 10.2.0.1/32 needs to respond to 10.1.0.1/32, the process may be reversed. 10.2.0.1/32 forwards a response packet to its local ITR, which may be optionally on the same hardware as the ETR. The ITR queries the mapping server, receives the RLOC for the ETR servicing 10.1/16, wraps the packet with a LISP header, and routes the packet appropriately. When the target ETR receives the packet, it decapsulates the packet and forwards it to the EID 10.1.0.1/32.

One feature of some LISP embodiments is that the mapping provided by the mapping server is stateless. In other words, the mapping server does not maintain records of which ITRs have requested RLOCs for which ETRs or subnetworks. Having a stateless LISP deployment simplifies the design of the LISP mapping server, and reduces its storage needs.

Because it is inefficient for the ITRs to query a mapping database every time they need to forward a packet to a particular subnetwork, LISP also incorporates a concept of a time to live (TTL). When an ITR queries the mapping server for a particular EID, the mapping server may respond with the RLOC for the ETR servicing that subnetwork, and may append thereto a TTL. The ITR can then continue to use that RLOC for routing traffic to the subnetwork until expiry of the TTL. When the TTL expires, the ITR again queries the mapping server for the RLOC of the ETR.

The mapping server populates its mapping database when ETRs register subnetworks that they control. For example, when the 10.1/16 subnetwork first comes online, the ETR servicing that subnetwork may register 10.1/16 to the mapping server, along with its own RLOC.

However, a challenge can arise when a mobility event occurs and the RLOC associated with a subnetwork changes. For example, a mobility event may include the failure of an ETR (where it is replaced by a different ETR at a different location), an upgrade of an ETR, change of an ETR property or properties, moving of an ETR from one data center to another, or any other event that changes the RLOC associated with a subnetwork. A mobility event for a virtual machine (VM) could also lead to a similar scenario, wherein the ETRs remain static, but the VR movement results in changes to its servicing ETR.

If a mobility event occurs before expiry of the TTL, then an ITR may attempt to route traffic to the now-stale RLOC for the subnetwork. These attempts to route the traffic may fail, causing disruptions in network services, dropped packets, and other difficulties.

To address the challenges of mobility events that occur during a TTL, certain embodiments of a LISP mapping server may provide a publication/subscription (Pub/Sub) framework.

In those cases, when an ITR requests an RLOC for a subnetwork, it may implicitly or explicitly also subscribe to routing changes for that subnetwork. Thus, if a mobility event occurs and the RLOC changes, when the change occurs, the mapping server may query a subscription database for any ITRs that are subscribed to that subnetwork. The mapping server may then publish to those ITRs the new RLOC for the ETR that is now servicing the subnetwork.

The concept of publish/subscribe (Pub/Sub) in LISP introduces some statefulness for the LISP mapping server. The mapping server is stateful to the extent that it maintains a database of ITRs that are subscribed to particular subnetworks.

LISP can be deployed in large data centers or enterprise networks. In such a configuration, a LISP deployment may need to support multiple instances or tenants in a segmented network. Often, it is desirable to provide a shared service or services for multiple instances or tenants in such a segmented network. Thus, it may be desirable to allow endpoints on multiple subnetworks to all reach the same service instance. For example, the service instance may be some network function that can usefully be shared among multiple tenants. This allows the different segments to connect to the shared service segment, and shared services segment to connect to the different instances or segments. But, the connectivity from the multiple tenants to the shared service should not result in connectivity between the different segments themselves. The shared services segment should not become a transit segment between the other segments.

This functionality may be referred to as an "extranet," and existing network infrastructure may exist for achieving extranet functionality in certain enterprise networks.

However, providing extranet functionality within a LISP distribution may include additional challenges. Thus, the present specification provides a system and method for extranet connectivity in a segmented or multi-instance LISP network for both unicast and multicast traffic.

Throughout this specification, by way of example, an extranet may be described as a shared services segment that acts as a provider segment, identified by a provider IID (instance identifier). A plurality of private segments may also act as consumer segments for the provider segment, with the consumer segments identified by provider IIDs. Each segment may be identified by an instance ID (IID).

In an embodiment, the different segments are registered with a LISP mapping server so that the mapping server can build a database in which the IIDs for a provider segment are associated with the IIDs for consumer segments with which they will be able to establish cross segment communication.

In one embodiment, consumer and provider IIDs may be configured with knowledge of each other. For example, consumer IIDs may be configured at their ETR with a list of provider (extranet) IIDs that they subscribe to, and provider IIDs may be configured at their egress tunnel router (ETR) with a list of consumer IIDs that they communicate with. This list may be referred to as an extranet policy table, which is a list of IIDs that act as an extranet IID peer list. The LISP mapping server may, through LISP registrations, have full knowledge of the extranet IID peer list for each IID, thus being able to maintain a comprehensive extranet policy table. In one embodiment, this shared services segment registers with an extranet provider flag set, and the registering xTR has the consumer IIDs configured under the provider IID that identifies the shared services segment. Private segments may register with an extranet consumer flag, as well as a specification of the IID of the extranet provider segment that they are to connect to. The mapping server, on reception of the registrations with these attributes, may include for each record in the extranet policy table a list of destination instances to look up beyond the original instance of the source traffic. The map reply may be augmented to include the mapping, as well as the IID for the destination segment. The mapping may be cached in the source virtual routing and forwarding (VRF). Caching may be handled in any suitable way, including, by way of nonlimiting example:

a. In-transit segment hopping: the mapping returned may include the destination IID, and traffic may be forwarded based on the source VRF caching. The traffic may be encapsulated with the destination IID in the overlay header (LISP or VXLAN header). The ingress tunnel router (ITR) may include the destination IID in the tunnel adjacency that is formed for forwarding based on two things: one, the IID received in the map reply, and two, the provider IID configured may instantiate a vlan/BD with the relevant virtual network (VN) segment (provider IID) useful in the formation of a cross IID adjacency. Stated otherwise, the ITR may not simply derive the IID to be instantiated at the ITR, nor do source the VRFs need to be instantiated at the ETRs.

b. Destination/local segment hopping: the mapping returned may include a valid RLOC set but not the destination IID. Traffic may be forwarded to the ETRs with the source IID. At the ETR, traffic may be looked up at the source VRF and an extranet adjacency may allow traffic to leak from the source VRF to the destination VRF using similar mechanisms as those currently used for VRF route leaking. The extranet adjacencies may be established locally at the ETRs at configuration time. In this case, source VRFs may be configured at the ITR and ETR, and destination VRFs may be configured at the relevant ETRs.

The system and method of the specification also support signal free multicast extranet. By way of example, the following heuristic may allow cross IID multicast in a signal free based multicast overlay:

1. ETRs may register as members of a group G replication list with the IID of the listener from which interest in the group was gleaned (e.g., IGMP or PIM snooping), and an outbound interface list (OIL) may be built for each IID in which interest is detected according to standard signal free behavior. For any group G, there may be a separate record or replication list for each IID in which there are listeners.

2. When a source sends traffic to group G, ITRs may issue a map request with the IID of the source, again according to standard signal free behavior.

3. The map server may receive the map request and perform a lookup for G in the requester's source IID as well as in all IIDs in the corresponding extranet IID peer list (i.e., the extranet policy table), including a list of consumer IIDs for the source IID. The LISP map server may consolidate or merge the multiple records found into a single replication list for G, and reply with the consolidated or merged replication list and the IID of the requester or source.

4. The ITR may send the traffic according to the consolidated replication list received in the map reply, and may use the IID of the source for encapsulation.

5. The ETRs may receive the traffic with the source IID. If the traffic received is multicast traffic (i.e., the payload is multicast), the ETR may "explode/replicate" the traffic to the G OIL in each IID in the extranet policy table or extranet IID peer list for the source IID.

In some embodiments, unicast may use "in-transit segment hopping" while multiclass traffic may use "destination/local segment hopping." In other embodiments, both unicast and multicast may leverage "destination/local segment hopping."

A system and method for extranet connectivity in LISP networks will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of an example cloud ecosystem 100 according to one or more examples of the present specification. Cloud ecosystem 100 is an embodiment of one non-limiting example of a system and method for stateful LISP subscription for overlapping subnetworks.

Figure 4:
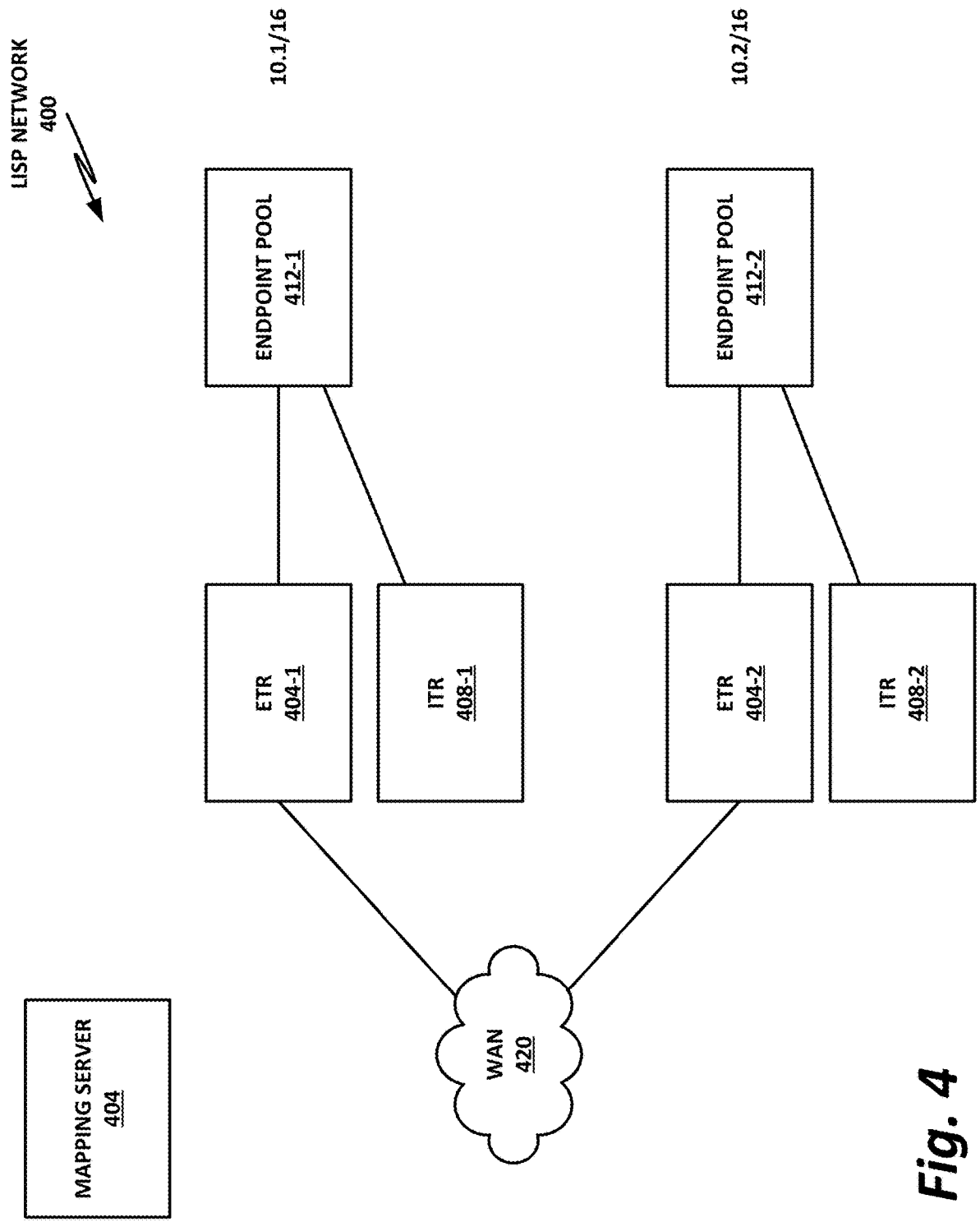
FIG. 4 is a block diagram of a LISP network according to one or more examples of the present specification.

In this embodiment, cloud ecosystem 100 may be configured to use LISP to enable endpoints in various subnetworks to communicate with one another. This operation may be facilitated by a controller 110 in data center 120. In certain embodiments, such as those in which data center 120 is an SDN as illustrated in FIG. 4, controller 110 may be an SDN controller (SDN-C). However, not all controllers 110 need necessarily be SDN-Cs, and not all SDN-Cs are configured to function as a controller 110. Thus, the illustrated embodiment should be understood as a non-limiting example, disclosed for the purpose of facilitating discussion and aiding in understanding the present disclosure.

Controller 110 may communicate with various resources of data center 120 (illustrated as cubes) via a network 130. Each resource or manager(s) of said resources can be associated with one or more server 140 implementing a log collector 142 for providing real-time logs and/or metrics associated with the resources to controller 110. Controller 110 can also communicate with the one or more server 140, via the network 130, or via another network not shown in FIG. 1. Log collector 142 can provide real-time logs and/or metrics associated with resources in data center 120, and associated with data center 120 in part or as a whole, to controller 110. To generate logs and/or metrics related to data center 120, server 140 could be communicatively connected to data center 120 directly, via network 130, or via another network not shown in FIG. 1.

Elements of FIG. 1 may be coupled to one another through one or more interfaces employing any suitable connections (wired or wireless), which provide viable pathways for network communications. Additionally, one or more of these elements of FIG. 1 may be combined, divided, or removed from the architecture based on particular configuration needs. Cloud ecosystem 100 may include a configuration capable of transmission control protocol/internet protocol (TCP/IP) communications for the transmission and/or reception of packets in the network. Cloud ecosystem 100 may also operate in conjunction with a user datagram protocol/IP (UDP/IP), any other suitable protocol, or any suitable combination thereof where appropriate and based on particular needs. For purposes of illustrating the techniques of the controller 110, it is important to understand the activities that may be present in cloud ecosystem 100. The following foundational information may be viewed as a basis from which the present disclosure may be properly explained. Such information is offered for purposes of explanation only and, accordingly, should not be construed in any way to limit the broad scope of the present disclosure and its potential applications.

Turning, again, to the infrastructure of FIG. 1, network 130 represents a series of points or nodes of interconnected communication paths for receiving and transmitting packets of information that propagate through the cloud ecosystem 100. Network 130 may be any suitable network or combination of one or more networks operating on one or more suitable networking protocols, including for example, a local area network, an intranet, a virtual network, a wide area network, a wireless network, a cellular network, or the Internet (optionally accessed via a proxy, VM, or other similar security mechanism) by way of nonlimiting example. Network 130 may also include one or more servers, firewalls, routers, switches, security appliances, antivirus servers, or other useful network devices, which in an example may be virtualized within an SDN. In this illustration, network 130 is shown as a single network for simplicity, but in some embodiments, network 130 may include a large number of networks, such as one or more enterprise intranets connected to the internet.

For ease of illustration, however, not all elements of FIG. 1 are depicted with communication lines traversing network 130. In network 130, network traffic, which could include packets, frames, signals, cells, datagrams, protocol data units (PDUs), data, etc., can be sent and received according to any suitable communication messaging protocols. Suitable communication messaging protocols can include a multi-layered scheme such as the Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node (e.g., controller 110) and a destination node via network 130. A packet includes, but is not limited to, a source network address, a destination network address, and a payload containing the information to be communicated. By way of example, these network addresses can be Internet Protocol (IP) addresses in a TCP/IP messaging protocol. Information is generally represented by data and, as used herein, "data" refers to any type of binary, numeric, voice, video, media, textual, or script data, or any type of source or object code, or any other suitable information in any appropriate format that may be communicated from one point to another in electronic devices and/or networks.

Server 140 can be configured to provide system logs and metrics of the resources in data center 120 to controller 110. System metrics can include information related to or summarizing current system state and/or activity including, but not limited to, number of on-going client operations, current central processing unit (CPU) utilization, disk usage or load on the storage nodes, available network bandwidth, remaining disk input/output operations per second (IOPS), remaining disk bandwidth, etc. In at least one embodiment, these metrics can be pushed to the controller 110 by the metrics collectors in real-time. The controller 110 or server 140 may store the metrics in metrics repository 164, which may be internal to the controller 110 or external (entirely or in part). In other embodiments, server 140 may store real-time system metrics in the metrics repository 164 without accessing the controller 110.

In some cases, server 140 can be configured to log events and activities in data center 120 to controller 110. Logs can include information related to events, errors, device drivers, system changes, etc. In at least one embodiment, these logs can be pushed to the controller 110 by the server 140 in real-time. The controller 110 or server 140 may store the system logs in logs repository 160, which may be internal to the controller 110 or external (entirely or in part). In other embodiments, server 140 may store real-time system logs in the logs repository 160 without accessing the controller 110. In certain embodiments, a log may include object and state pairings.

Controller 110 can be implemented by one or more network elements in cloud ecosystem 100. As used herein, the term "network element" is meant to encompass servers, processors, modules, routers, switches, cable boxes, gateways, bridges, load balancers, firewalls, inline service nodes, proxies, or any other suitable device, component, element, or proprietary appliance operable to exchange information in a network environment. This network element may include any suitable hardware, software, components, modules, or interfaces that facilitate the operations thereof. This may be inclusive of appropriate algorithms and communication protocols that allow for the effective exchange of data or information.

Figure 2:
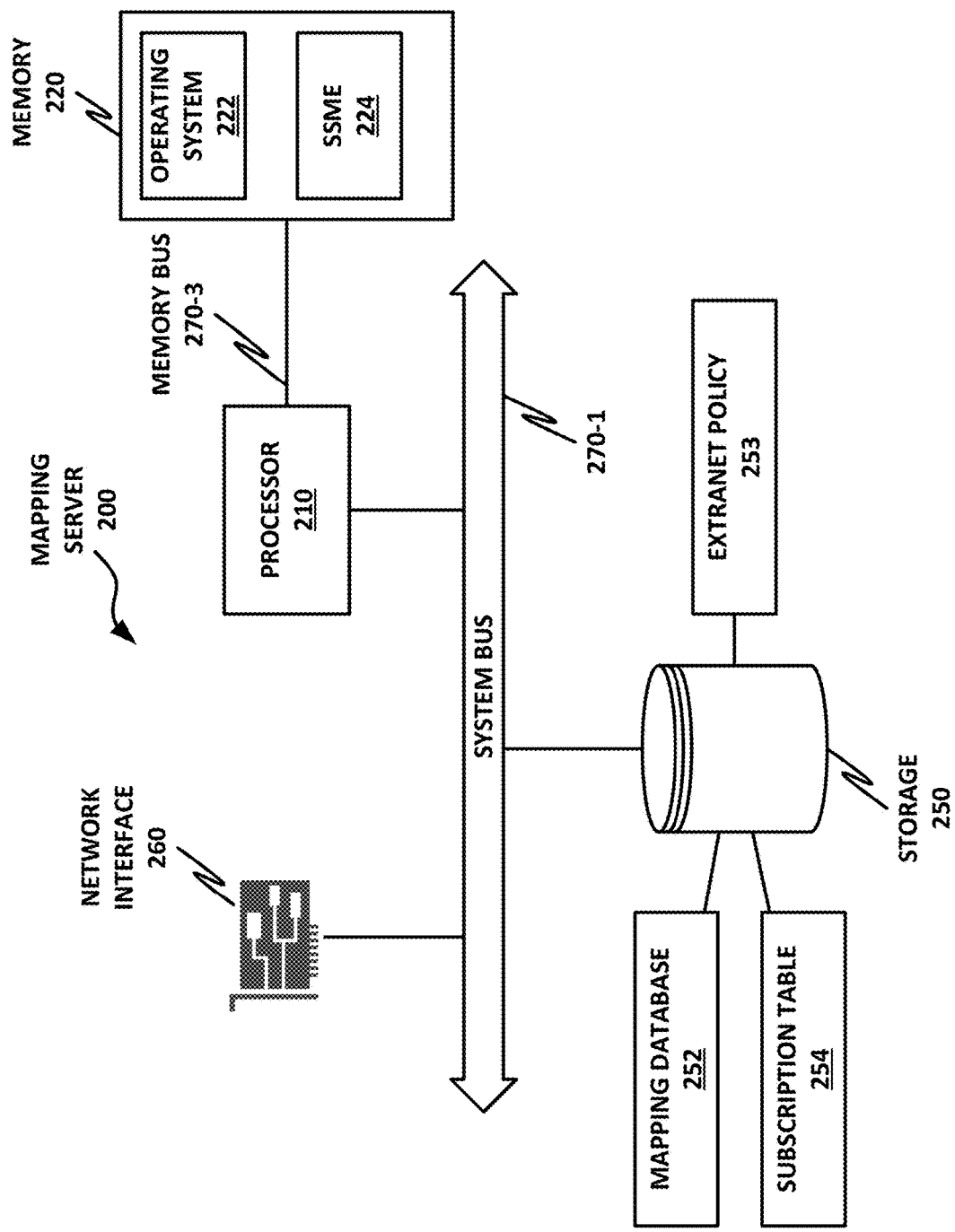
FIG. 2 is a block diagram of a mapping server according to one or more examples of the present specification.

FIG. 2 is a block diagram of a mapping server according to one or more examples of the present specification. The mapping server may be any suitable computing device, and can also be a distributed system. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host." In certain embodiments, administration console 150 may be an example of mapping servers.

Mapping server 200 includes a processor 210 connected to a memory 220, having stored therein executable instructions for providing an operating system 222 and at least software portions of a shared subnetwork mapping engine (SSME) 224. Other components of mapping server 200 include a storage 250 (wherein may be stored a mapping database 252, an extranet policy 253, and a subscription table 254), network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Stored within storage 250 may be a mapping database 252, an extranet policy 253, and a subscription table 254. The mapping database 252 enables mapping server 200 to maintain a list of the RLOCs for all ETRs in the LISP network. Extranet policy 253 is a list of IIDs that act as an extranet IID peer list. Subscription table 254 enables mapping server 200 to keep track of which ITRs are subscribed to which RLOCs, for example, in the case of a mobility event. Storage 250 may also include a stored copy of operational software such as operating system 222 and software portions of SSME 224. Many other configurations are also possible, and are intended to be encompassed within the broad scope of this specification.

Network interface 260 may be provided to communicatively couple mapping server 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

SSME 224, in one example, is operable to carry out computer-implemented methods as described in this specification. SSME 224 may include one or more tangible non-transitory computer-readable mediums having stored thereon executable instructions operable to instruct a processor to provide a SSME 224. As used throughout this specification, an "engine" includes any combination of one or more logic elements, of similar or dissimilar species, operable for and configured to perform one or more methods provided by the engine. Thus, SSME 224 may comprise one or more logic elements configured to provide methods as disclosed in this specification. In some cases, SSME 224 may include a special integrated circuit designed to carry out a method or a part thereof, and may also include software instructions operable to instruct a processor to perform the method. In some cases, SSME 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that SSME 224 may also include other hardware and software, including configuration files, registry entries, and interactive or user-mode software by way of non-limiting example.

In one example, SSME 224 includes executable instructions stored on a non-transitory medium operable to perform a method according to this specification. At an appropriate time, such as upon booting mapping server 200 or upon a command from operating system 222, processor 210 may retrieve a copy of the instructions from storage 250 and load it into memory 220. Processor 210 may then iteratively execute the instructions of SSME 224 to provide the desired method.

Figure 3:
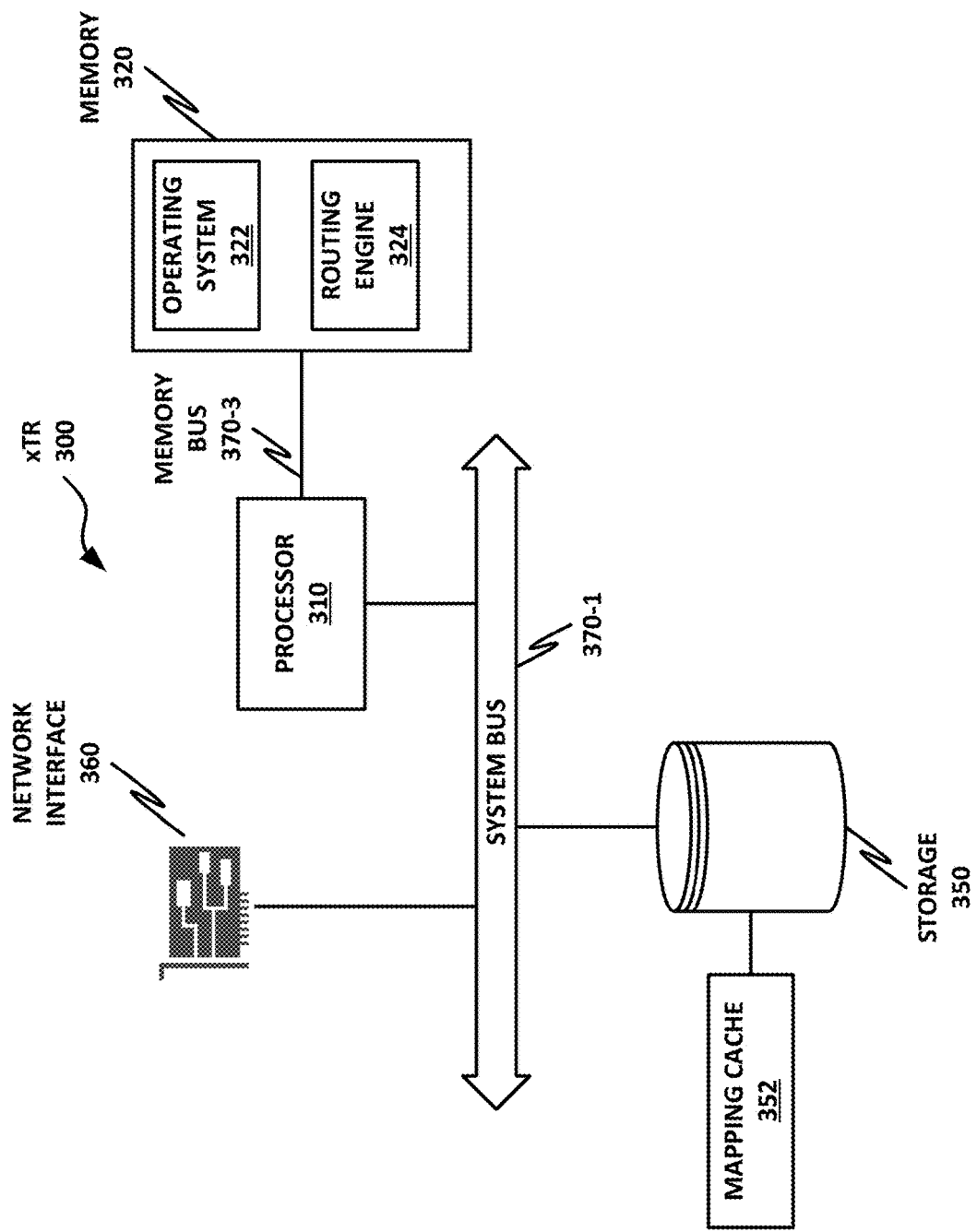
FIG. 3 is a block diagram of a LISP xTR according to one or more examples of the present specification.

FIG. 3 is a block diagram of an xTR 300 according to one or more examples of the present specification. As presently disclosed, xTR 300 may be any suitable computing device, as described in connection with FIG. 2. In general, the definitions and examples of FIG. 2 may be considered as equally applicable to FIG. 3, unless specifically stated otherwise. In the present disclosure, xTR 300 is described separately to illustrate that in certain embodiments, logical operations according to this specification may be divided along a client-server model, while xTR 300 provides certain other centralized tasks. In contemporary practice, xTR 300 is more likely to be provided as a "headless" VM running on a computing cluster, or as a standalone appliance, though these configurations are not required. An xTR may also have a table for the EID prefixes it has subscribed to (updated with new subscriptions or deleting subscriptions, by way of nonlimiting example).

In certain embodiments, controller 110, log collector 142, and data center resources may be embodied as xTRs 300.

Included in xTR 300 is a processor 310 connected to a memory 320, having stored therein executable instructions for providing an operating system 322 and at least software portions of a routing engine 324. Routing engine 324 provides the routing functions for xTR 300. This can include logic to query mapping server 200 of FIG. 2 when routing traffic to an ETR for an EID in a different subnetwork.

Routing engine 324 may also include logic for encapsulating and/or decapsulating LISP packets. Other components of xTR 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of routing engine 324.

In storage 350, there is a mapping cache 352. When routing engine 324 queries mapping server 200 for the RLOC of an EID, mapping server 200 may respond with an RLOC associated with a subnetwork containing that EID. Routing engine 324 may then cache that RLOC in mapping cache 352. The cached entry may have a TTL, and after a time, routing engine 324 may explicitly unsubscribe from the RLOC for that subnetwork, or may simply delete the entry after the TTL. A common value for a TTL is approximately 24 hours.

Network interface 360 may be provided to communicatively couple server 140 to a wired or wireless network, and may include one or more logic elements as described in FIG. 2.

Routing engine 324 is an engine as described in FIG. 2 and, in one example, includes one or more logic elements operable to carry out computer-implemented methods as described in this specification. Software portions of server engine 324 may run as a daemon process.

Routing engine 324 may include one or more non-transitory computer-readable mediums having stored thereon executable instructions operable to instruct a processor to provide a security engine. At an appropriate time, such as upon booting server 140 or upon a command from operating system 322 or a user or security administrator, processor 310 may retrieve a copy of routing engine 324 (or software portions thereof) from storage 350 and load it into memory 320. Processor 310 may then iteratively execute the instructions of routing engine 324 to provide the desired method.

FIG. 4 is a block diagram of a LISP network 400 according to one or more examples of the present specification. As described elsewhere in this specification, a mapping server 404 may provide mapping services to LISP network 400.

In a LISP network, a plurality of ETRs 404 service a plurality of subnetworks, which may not be reachable absent a LISP system. A plurality of ITRs 408 provide encapsulation services to carry out those communications. For example, endpoint pool 412-1 includes the subnetwork 10.1/16, and is serviced by ETR 404-1 and ITR 408-1. ETR 404-1 and ITR 408-1 may be embodied in a single device, or in different devices according to the needs of a particular implementation.

Endpoints in endpoint pool 412-1 have EIDs in the 10.1/16 subnetwork. Endpoints in endpoint pool 412-2 are in the 10.2/16 subnetwork, and are serviced by ETR 404-2 and ITR 408-2.

In this example, LISP network 400 is serviced by a wide area network (WAN) 420, which communicatively couples subnetwork 10.1/16 to subnetwork 10.2/16. ITR devices are also connected to the WAN. If the ETR and ITR utilize the same hardware, a single connection to the WAN is sufficient. However, if the ETR and ITR are separate HW devices, then both are connected to the WAN.

When an endpoint in endpoint pool 412-1 wishes to communicate with an endpoint in endpoint pool 412-2, it sends a packet to ITR 408-1, which queries mapping server 404 for an RLOC associated with the particular EID. For example, the packet may have a destination EID of 10.2.0.1/32. ITR 408-1 queries mapping server 404, which looks up the mapping in its mapping database. Mapping server 404 determines that the longest prefix available for 10.2.0.1/32 is the 10.2/16 subnetwork. Thus, mapping server 404 responds to ITR 408-1 with an RLOC for ETR 404-2. ITR 408-1 caches the 10.2/16 subnetwork RLOC, and proceeds to route the packet to ETR 404-2.

Upon receiving the packet, ETR 404-2 decapsulates the packet, determines that its EID is 10.2.0.1/32, and forwards the packet to the internal IP address 10.2.0.1.

If the endpoint at 10.2.0.1 needs to respond, it may forward the response packet to ITR 408-2. The destination EID of the response packet is 10.1.0.1/32. ITR 408-2 queries mapping server 404 for an RLOC for 10.1.0.1/32. Mapping server 404 matches the EID against its mapping database, and determines that the longest prefix for this packet is 10.1/16. Mapping server 404 therefore responds to ITR 408-2 with a mapping to the RLOC for ETR 404-1. ITR 408-2 routes the packet via WAN 420 to ETR 404-1.

ETR 404-1 inspects the packet, determines that it is a valid packet for subnetwork 10.1/16, and forwards the packet to 10.1.0.1/32 in endpoint pool 412-1.

As described above, mapping server 404 may also maintain a subscription database. When an ITR 408 queries mapping server 404 with an EID, mapping server 404 may implicitly create a subscription for the ITR to the RLOC associated with that EID. Alternately, the ITR 408 may explicitly subscribe to that particular subnetwork.

Figure 5A:
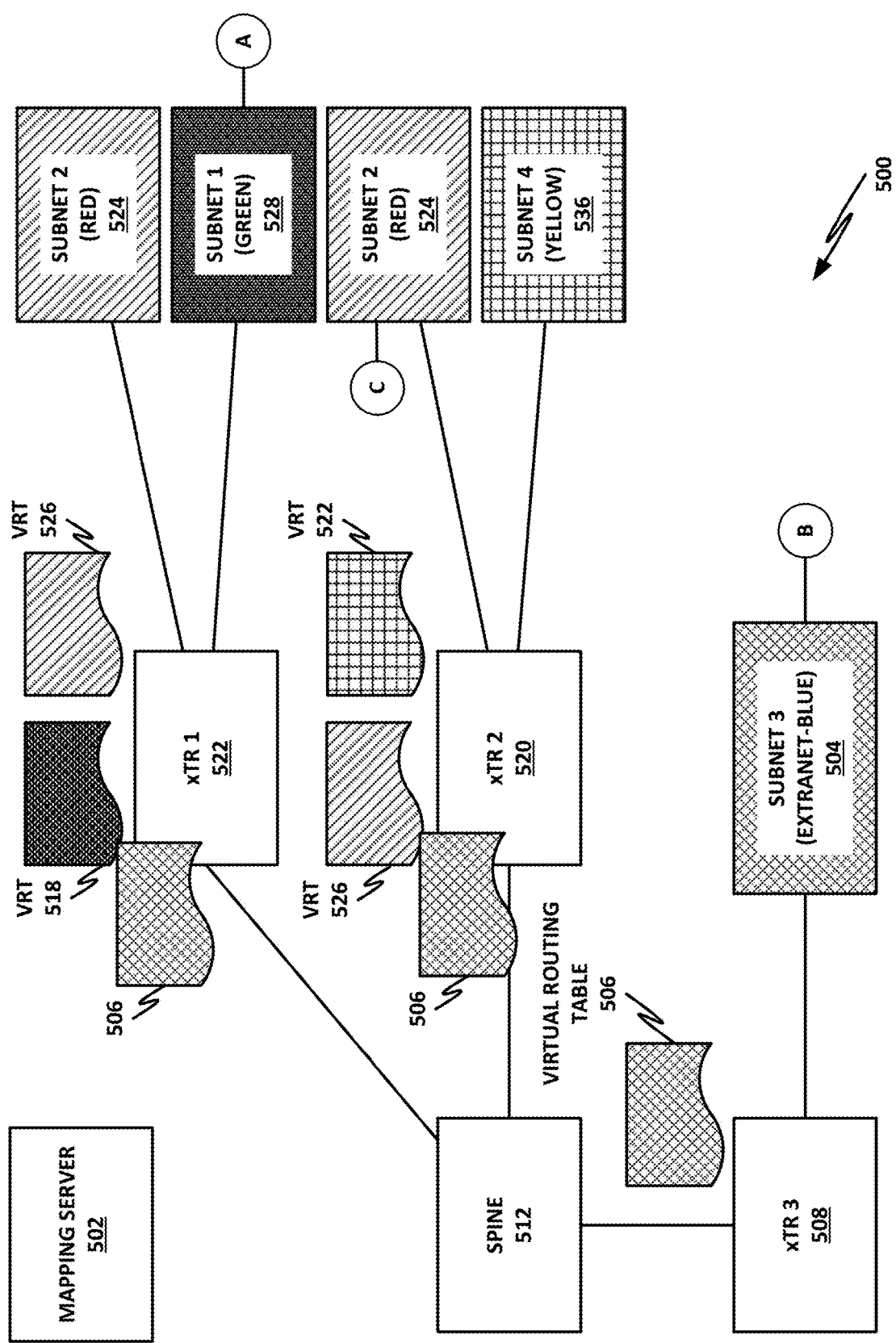
FIG. 5a is a further block diagram illustration of a LISP network according to one or more examples of the present specification.

FIG. 5a is a block diagram illustration of a LISP network 500 according to one or more examples of the present specification. LISP network 500 includes a number of subnetworks or virtual networks, which may belong to different tenants, and thus may need to be segregated. In this illustration, the various subnetworks are each tagged with a color. The use of this color scheme is not to imply any particular relationship or hierarchy within the subnetwork, but rather merely as a useful convention for simplifying the present discussion. In this example, four different subnetworks are disclosed, namely subnetwork 1 528, which is identified as the "green" network, subnetwork 2 524, which is identified as the "red" subnetwork, subnetwork 3 504 "blue," and subnetwork 4 536 "yellow."

Blue extranet 504 is a provider subnetwork, while red subnet 524 and green subnet 528 may be considered consumer subnetworks for the service provided by blue extranet 504.

In this example, blue subnet 504 is an extranet. This means that it may be desirable to share the functionality of blue subnet 504 with the other subnets, such as one or more of green subnet 528, red subnet 524, and yellow subnet 536. For example, blue subnet 504 may be a virtual network function, which provides, for example, an antivirus scanning service. This function can be shared among the various tenants of a data center. Thus, it may be desirable to provide routability from both green subnet 528 and red subnet 524 to blue subnet 504. However, it is not desirable for that to result in routability from green subnet 528 to red subnet 524.

LISP network 500 is serviced by a mapping server 502, and also includes a spine switch 512 servicing three xTRs, namely xTR 1 522, xTR 2 520, and xTR 3 508.

In this example, endpoints A and C may be connected to subnetworks green 528 and red 524, respectively. Endpoint A is connected to green subnet 528 via xTR 1 522. Endpoint C is connected to red subnet 524 via xTR 2 520. As the xTRs service these various networks, they may cache local copies of a virtual routing table for each subnetwork that they service. For example, xTR 3 508 in this illustration services only blue subnet 504. Thus, xTR 3 508 includes a copy of blue virtual routing table (VRT) 506.

Further, xTR 1 services both the green subnet 528 and red subnet 524, so that xTR 1 will cache a copy of both green VRT 518 and red VRT 526. As xTR 2 520 services red subnet 524 and yellow subnet 536, it thus caches a copy of red VRT 526 and yellow VRT 522.

By way of illustration, assume that each subnet includes 10,000 endpoints. Thus, each VRT may need to maintain 10,000 entries to provide routability to each endpoint in its respective subnet.

However, to provide routability to blue extranet 504, the respective xTRs may also need to make a copy of the blue VRT into the respective VRTs of the other subnets. So, for example, without the extranet routing, xTR 1 522 includes 20,000 total entries, namely 10,000 for green VRT 518 and 10,000 for red VRT 526. However, when blue extranet 504 is discovered, xTR 1 522 copies VRT 506 into both VRT 518 and VRT 526. This ensures that addresses on blue extranet 504 are reachable by red subnet 524 and green subnet 528.

Furthermore, to ensure that blue extranet 504 can reach red subnet 524 and green subnet 528, the copies of green VRT 518 and red VRT 526 may both be copied into blue VRT 506. Thus, instead of containing 10,000 entries, blue VRT 506 now contains 30,000. xTR 1 522 now has two VRTs with 20,000 entries each, for a total of 40,000 entries.

Similarly, xTR 2 includes red subnet 524 and yellow subnet 536. Red subnet 524 subscribes to blue extranet 504, but yellow subnet 536 does not. Thus, xTR 2 520 copies blue VRT 506 into red VRT 526 of xTR 2 520. Now xTR 2 520 includes one VRT 526 with 20,000 entries and one VRT 522 with 10,000 entries, for a total of 30,000 entries.

This illustrates that the use of extranets in a LISP network may result in a large number of very large routing tables. This can become a burden on memory and performance.

Figure 5B:
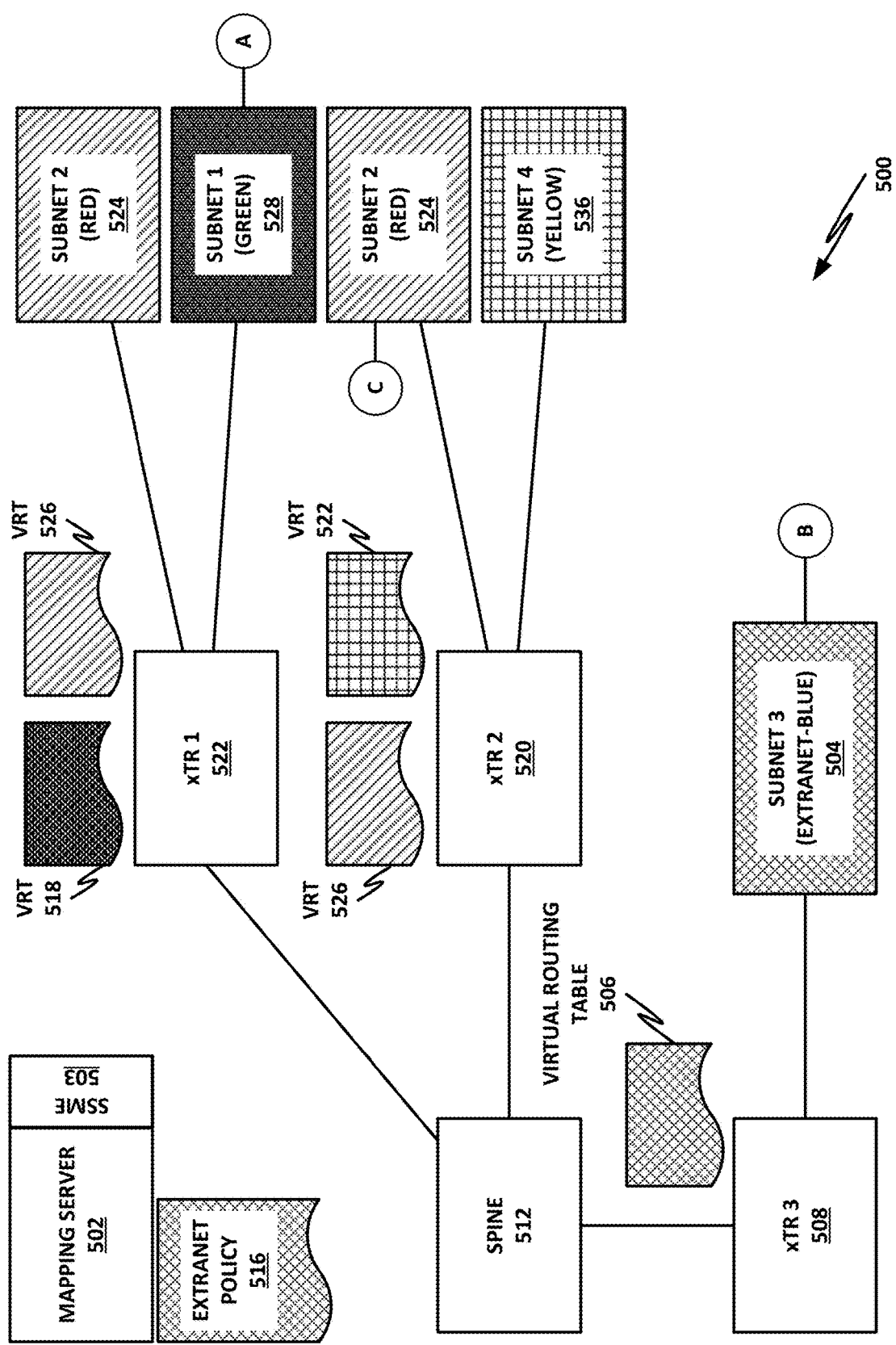
FIG. 5b illustrates an alternative embodiment of a LISP network according to one or more examples of the present specification.

FIG. 5*b* illustrates an alternative embodiment, in which the respective VRTs are not copied into each other, but rather mapping server 502 provides an extranet policy 516 which includes an extranet IID peer list for each IID in LISP network 500. Mapping server 502 may also include SSME 503, which provides mappings to shared subnetworks according to an extranet policy 516.

In the example of FIG. 5*b*, LISP network 500 still has blue extranet 504. As before, green subnet 528 and red subnet 524 subscribe to blue extranet 504, while yellow subnet 536 does not.

In this example, each consumer IID is configured at its xTR (specifically at the ETR) with a list of provider extranet IIDs that the subnetwork subscribes to. Thus, xTR 1 522 is configured with knowledge that red subnet 524 and green subnet 528 both subscribe to blue extranet 504. Further, xTR 2 520 is configured with knowledge that red subnet 524 subscribes to blue extranet 504. This knowledge may include a local extranet IID peer list. However, note that the xTRs need not have a full IID peer list. For example, xTR 2 520 does not need to know that green subnet 528 subscribes to blue extranet 504, because xTR 2 520 does not service any members of green subnet 528.

Extranet policy table 516 on mapping server 502 includes a comprehensive extranet IID peer list for all IIDs.

Blue extranet 504 may register to mapping server 502 with the extranet provider flag set, and xTR 3 508 may have the consumer IIDs configured under the provider IID that identifies the shared services segment.

Further, xTR 1 522 may register red subnet 524 and green subnet 528 with the extranet consumer flag, as well as a specification of the IID of blue extranet 504 to which red subnet 524 and green subnet 528 subscribe. Upon receiving these registrations, mapping server 502 includes these attributes for each registration in extranet policy 516, which includes a list of destination instances to look up beyond the original instance of the source traffic. Stated otherwise, when endpoint A on green subnet 528 sends traffic with the destination of endpoint B on blue extranet 504, mapping server 502 queries its mapping database to look for the EID of B in the routing table for green subnet 528. Normally, if that EID is not found within the green subnet space, then mapping server 502 would respond with "no route." However, with extranet policy table 516, mapping server 502 can also check the policy mappings and determine that green subnet 528 is a subscriber to blue subnet 504. Thus, before returning a "no mapping" response, mapping server 502 may search the VRT for blue extranet 504, find the appropriate EID, and return a mapping for that EID. Thus, it is not necessary for xTR 1 522 to populate VRT 518 with the full content of blue VRT 506.

Similarly, when endpoint C on red subnet 524 wants to reach endpoint B on blue extranet 504, xTR 2 sends a query to mapping server 502. Rather than searching red VRT 526, finding no match, and returning "no match," mapping server 502 checks extranet policy table 516 and determines that red subnet 524 subscribes to blue extranet 504, and thus also searches blue VRT 506. Upon finding a match, mapping server 502 responds with an RLOC for xTR 3, thus enabling endpoint C to reach endpoint B.

On the reverse route, when endpoint B on blue extranet 504 wishes to reach endpoint C on red subnet 524 or endpoint A on green subnet 528, xTR 3 508 sends a map request to mapping server 502. In this case, extranet policy 516 also includes a reverse lookup table that indicates all subnets that subscribe to blue extranet 504. Thus, mapping server 502 will search both green VRT 518 and red VRT 526 for a matching EID.

Note that SSME 503 may also support multicast semantics. In the case of multicast semantics, individual subnetworks may register interest for a multicast. For example, blue extranet 504 may be providing a multicast such as a video. Red subnet 524 and green subnet 528 may both register interest in that multicast with mapping server 502. Mapping server 502 may register a group G, with red subnet 524 and green subnet 528 being members of group G. Mapping server 502 may then create a replication list with the IIDs of the listeners, i.e., red subnet 524 and green subnet 528.

When endpoint B on blue extranet 504 sends traffic to group G, the ITR of xTR 3 508 issues a map request to mapping server 502 with the IID of endpoint B.

Mapping server 502 receives the map request and performs a lookup for a group G in the blue VRT 506, as well as in green VRT 518 and red VRT 526. Mapping server 502 then consolidates and merges multiple records found into a single replication list for group G, and replies with the consolidated and merged replication list and the IID of endpoint B.

Further, xTR 3 508 sends the traffic according to the consolidated replication list received in the map reply and uses the IID of endpoint B for encapsulation.

When xTRs 520 and 522 receive traffic with the source IID, they identify the traffic as multicast traffic (for example, the payload is identified as a multicast payload).

The xTRs may then explode and replicate the traffic to the group G OIL in each IID in the extranet IID peer list for that xTR for the source IID.

Note that in some embodiments, unicast may use "in transit segment hopping," while multicast traffic may use "destination/local segment hopping." In other embodiments, both unicast and multicast may use "destination/local segment hopping."

Figure 6:
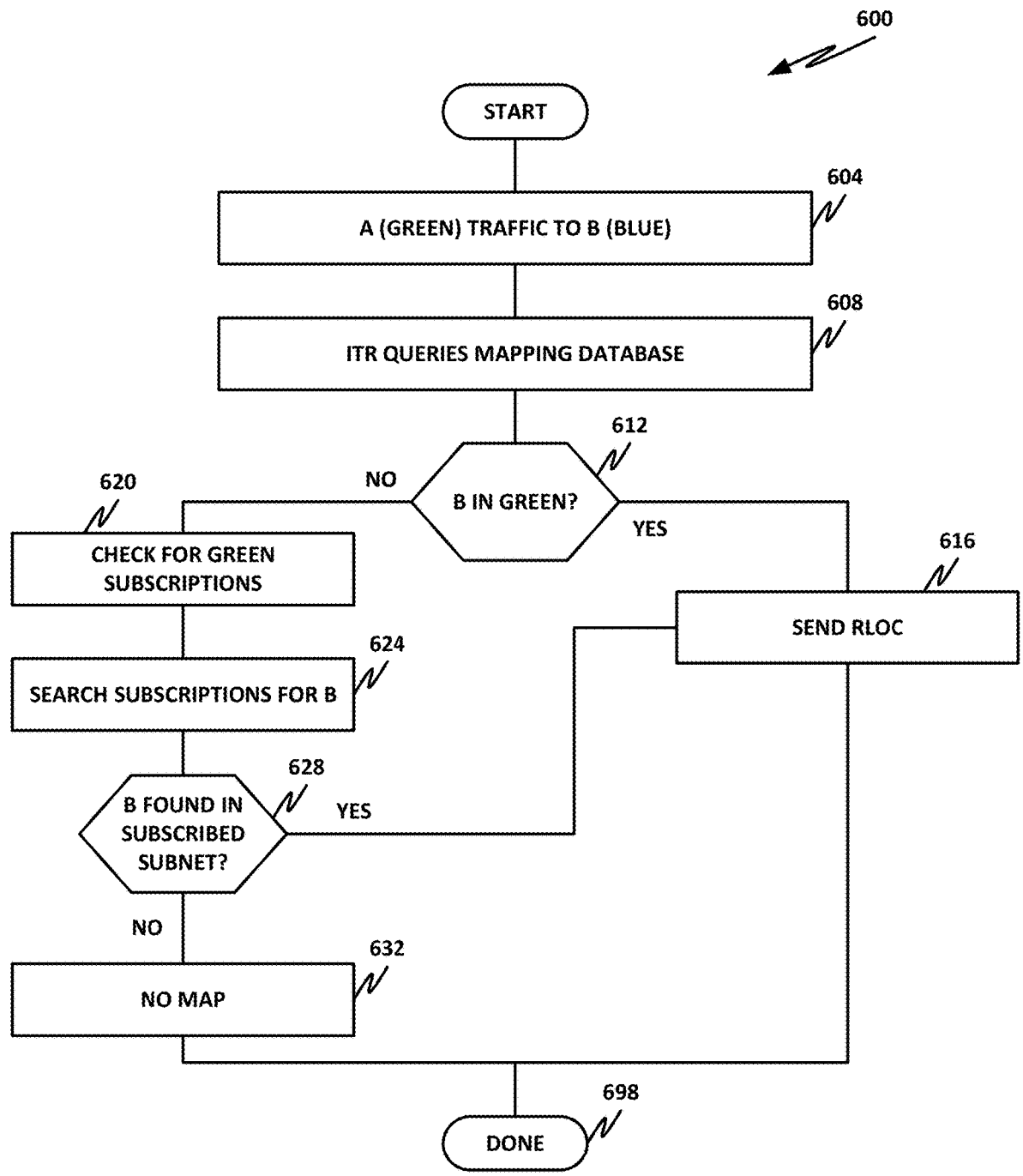
FIG. 6 is a flowchart of a method of performing a LISP lookup according to one or more examples of the present specification.

FIG. 6 is a flowchart of a method 600 of performing a LISP lookup according to one or more examples of the present specification. The example of FIG. 6 uses the same color codings of subnetworks as used in FIGS. 5a and 5b. Again, these color codings should be understood strictly as a means for helping to illustrate the differences between the subnetworks.

In block 604, an endpoint A on the green subnetwork wants to send traffic to endpoint B, which is located on the blue extranet.

In block 608, the ITR servicing endpoint A on the green subnetwork queries the mapping database for the EID of endpoint B.

In block 612, the mapping database first checks to see whether the EID for endpoint B is in the green virtual routing table.

If the EID for B is found in the green virtual routing table, then in block 616, the mapping server sends the RLOC for B to the ITR servicing endpoint A, and in block 698, the method is done.

Returning to block 612, if the EID for endpoint B is not found in the green virtual routing table, then in block 620, the mapping server checks the extranet policy table for green subscriptions, or in other words for extranets that green subscribes to.

In block 624, the mapping server searches the subscribed extranets for the EID of B. For example, if in block 620, the mapping server determines that the green subnetwork subscribes to the blue extranet, then in block 624, the mapping server searches the blue VRT and EID for endpoint B.

In decision block 628, the mapping server determines whether the EID for B was found in any of the subscribed subnetworks. If the EID was found, then in block 616, the mapping server sends an RLOC, and in block 698, the method is done.

On the other hand, if B was not found in the green VRT or in any of the VRTs for extranets that green subscribes to, then in block 632, the mapping server sends a "no map" response, and in block 698, the method is done.

Figure 7:
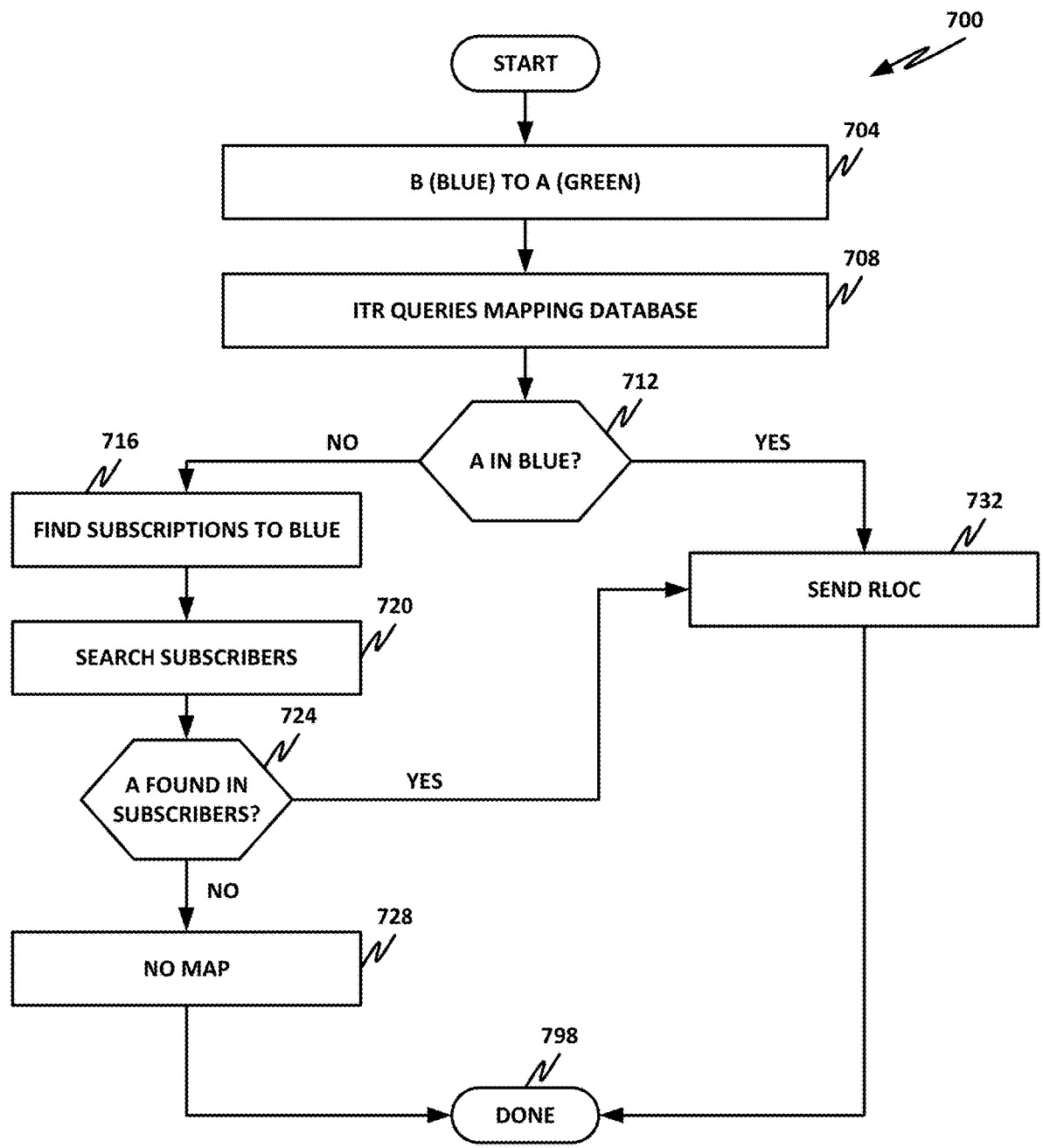
FIG. 7 is a flowchart of a method of handling a response from B back to A according to one or more examples of the present specification.

FIG. 7 is a flowchart of a method 700 of handling a response from B back to A according to one or more examples of the present specification. By way of example, method 700 may be thought of as a counterpart to method 600, wherein B responds to A after A sends its initial traffic to B.

In block 704, endpoint B on the blue extranet sends traffic to A on the green subnetwork.

In block 708, the ITR servicing endpoint B queries the mapping database for an EID for A.

In decision block 712, the mapping server checks to determine whether A is found in the blue VRT. If A is found in the blue VRT, then in block 732, the mapping server sends an RLOC for the xTR servicing A, and in block 798, the method is done.

Returning to decision block 712, if the EID for A is not found in the blue VRT, then in block 716, the mapping server checks its extranet policy to find subnetworks that subscribe to blue.

In block 720, the mapping server searches the VRTs for all subnetworks that subscribe to blue. For example, if in block 716, the mapping server found that green is a subscriber to blue, then in block 720, the mapping server will search the green VRT in addition to the blue VRT.

In decision block 724, the mapping server determines whether the EID for A was found in any of the subscribing networks to the blue extranet. If a match is found, then in block 732, the mapping server responds with an RLOC for an ETR servicing endpoint A, and in block 798, the method is done.

Returning to decision block 724, if A is not found in any of the subscribing subnetworks for the blue extranet, then in block 728, the mapping server returns a no map response, and in block 798, the method is done.

Figure 8:
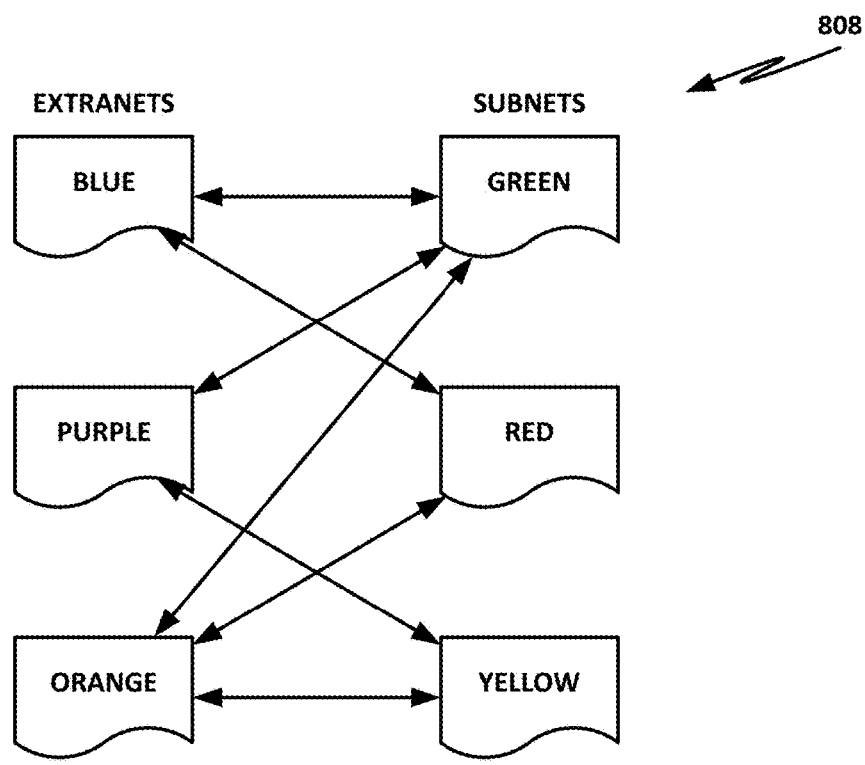
FIG. 8 is a block diagram illustrating aspects of an extranet policy according to one or more examples of the present specification.

FIG. 8 is a block diagram illustrating aspects of an extranet policy according to one or more examples of the present specification. In the example of FIG. 8, relational diagram 808 illustrates relationships between extranets and subnets. In this example, extranets blue, purple, and orange are provided. Subnets green, red, and yellow may subscribe to any of the available extranets.

In this example, green subscribes to blue, purple, and orange. Red subscribes to blue and orange. Yellow subscribes to purple and orange. These relationships are illustrated in subscriptions table 804 and subscribers table 806.

As illustrated in subscriptions table 804, subnet green has subscriptions to blue, purple, and orange. Subnet red has subscriptions to blue and orange. Subnet yellow has subscriptions to purple and orange.

As illustrated in subscribers table 806, subscribers to extranet blue include green and red. Subscribers to extranet purple include green and yellow. Subscribers to extranet orange include green, yellow, and red.

Thus, when the mapping server is performing a map lookup for an EID in green, it will also search blue, purple, and orange. When performing a map lookup for an EID in red, it will also search blue and orange. When performing a map lookup for an EID in yellow, it will also search purple and orange.

Similarly, when performing a lookup for an EID in the blue extranet, the mapping server will also search the green and red subnets. When performing a map lookup for purple, it will also search green and yellow. When performing a map lookup for orange, it will also search green, yellow, and red.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, controller 110 or xTRs 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiments, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms "memory" and "storage," as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

There is disclosed in one example, a Location/Identifier Separation Protocol (LISP) mapping server, comprising: a network interface for communicating with a LISP-enabled network; a mapping database; an extranet policy table; and a shared subnetwork mapping engine (SSME), comprising at least a hardware platform, configured to: receive a map request from a first endpoint serviced by a first xTR, the first endpoint on a first subnetwork, the map request for a second endpoint; determine that the second endpoint is not a member of the first subnetwork; query the extranet policy table to identify a second subnetwork that the first subnetwork subscribes to, and to determine that the second endpoint is a member of the second subnetwork; and provide to the first subnetwork a routing locator (RLOC) of an xTR servicing the second endpoint.

There is further disclosed an example of a LISP mapping server, wherein the second subnetwork is an extranet.

There is further disclosed an example of a LISP mapping server, wherein the first subnetwork is a consumer segment, and the second subnetwork is a provider segment.

There is further disclosed an example of a LISP mapping server, wherein providing the mapping to the destination endpoint comprises providing an instance identifier (IID).

There is further disclosed an example of a LISP mapping server, wherein the SSME is to provide multicast semantics.

There is further disclosed an example of a LISP mapping server, wherein the multicast semantics comprises receiving from the first endpoint a registration of interest for a multicast event from the second subnetwork, receiving from a third endpoint a registration of interest for the multicast event from the second subnetwork, identifying the first endpoint and third endpoint as listeners for the multicast event via the extranet policy table, and providing to the second subnetwork RLOCs for the first endpoint and third endpoint.

There is further disclosed an example of a LISP mapping server, wherein the SSME is further to send a copy of the extranet policy table to an xTR.

There is further disclosed an example of a LISP mapping server, wherein the SSME is further configured to receive an extranet subnetwork registration from an xTR.

There is further disclosed an example of a LISP mapping server, wherein the SSME is further configured to receive a subscribing subnetwork registration from an xTR, and to add the subscribing network to the mapping table for the extranet subnetwork.

There is also disclosed an example of one or more non-transitory computer-readable mediums having stored thereon executable instructions to instruct a hardware platform to: communicatively couple to a LISP-enabled network; provision a mapping database; provision an extranet policy table; and provide a shared subnetwork mapping engine (SSME) to: receive a map request from a first endpoint serviced by a first xTR, the first endpoint on a first subnetwork, the map request for a second endpoint; determine that the second endpoint is not a member of the first subnetwork; query the extranet policy table to identify a second subnetwork that the first subnetwork subscribes to, and to determine that the second endpoint is a member of the second subnetwork; and provide to the first subnetwork a routing locator (RLOC) of an xTR servicing the second endpoint.

There is further disclosed an example of one or more non-transitory computer-readable mediums, wherein the second subnetwork is an extranet.

There is further disclosed an example of one or more non-transitory computer-readable mediums, wherein the first subnetwork is a consumer segment, and the second subnetwork is a provider segment.

There is further disclosed an example of one or more non-transitory computer-readable mediums, wherein providing the mapping to the destination endpoint comprises providing an instance identifier (IID).

There is further disclosed an example of one or more non-transitory computer-readable mediums, wherein the SSME is to provide multicast semantics comprises receiving from the first endpoint a registration of interest for a multicast event from the second subnetwork, receiving from a third endpoint a registration of interest for the multicast event from the second subnetwork, identifying the first endpoint and third endpoint as listeners for the multicast event via the extranet policy table, and providing to the second subnetwork RLOCs for the first endpoint and third endpoint.

There is further disclosed an example of one or more non-transitory computer-readable mediums, wherein the SSME is further to send a copy of the extranet policy table to an xTR.

There is further disclosed an example of one or more non-transitory computer-readable mediums, wherein the SSME is further configured to receive an extranet subnetwork registration from an xTR.

There is further disclosed an example of one or more non-transitory computer-readable mediums, wherein the SSME is further configured to receive a subscribing subnetwork registration from an xTR, and to add the subscribing network to the mapping table for the extranet subnetwork.

There is also disclosed an example of a Location/Identifier Separation Protocol (LISP) tunneling router (xTR), comprising: a hardware platform; and an xTR routing engine to operate on the hardware platform and configured to: communicatively couple to a consumer subnetwork; and register the consumer subnetwork to a mapping server with a consumer subnetwork flag.

There is further disclosed an example of a LISP xTR, wherein the xTR routing engine is further configured to:

communicatively couple to a provider subnetwork; and register the provider subnetwork to a mapping server with a provider subnetwork flag.

There is further disclosed an example of a LISP xTR, wherein the xTR routing engine is further configured to: receive from the mapping server a copy of an extranet policy table for mapping between the consumer subnetwork and a provider subnetwork.

What is claimed is:

1. A Location/Identifier Separation Protocol (LISP) mapping server, comprising:
a network interface for communicating with a LISP-enabled network;
a mapping database;
an extranet policy table; and
a shared subnetwork mapping engine (SSME) implemented by a processor and configured to:
receive a map request from a first endpoint serviced by a first tunneling router (xTR), the first endpoint on a first subnetwork, the map request for a second endpoint;
determine that the second endpoint is not a member of the first subnetwork based on the mapping database;
query the extranet policy table to identify a second subnetwork that the first subnetwork subscribes to, and to determine that the second endpoint is a member of the second subnetwork; and
provide to the first subnetwork a routing locator (RLOC) of an xTR servicing the second endpoint.

2. The LISP mapping server of claim 1, wherein the second subnetwork is an extranet.

3. The LISP mapping server of claim 1, wherein the first subnetwork is a consumer segment, and the second subnetwork is a provider segment.

4. The LISP mapping server of claim 1, wherein the SSME is configured to provide to the first subnetwork the RLOC of the xTR servicing the second endpoint by providing an instance identifier (IID).

5. The LISP mapping server of claim 1, wherein the SSME is further configured to provide multicast semantics.

6. The LISP mapping server of claim 5, wherein the multicast semantics comprises receiving from the first endpoint a registration of interest for a multicast event from the second subnetwork, receiving from a third endpoint a registration of interest for the multicast event from the second subnetwork, identifying the first endpoint and third endpoint as listeners for the multicast event via the extranet policy table, and providing to the second subnetwork RLOCs for the first endpoint and third endpoint.

7. The LISP mapping server of claim 1, wherein the SSME is further configured to send a copy of the extranet policy table to the first xTR.

8. The LISP mapping server of claim 1, wherein the SSME is further configured to receive an extranet subnetwork registration from the first xTR.

9. The LISP mapping server of claim 8, wherein the SSME is further configured to receive a registration for a subscribing subnetwork from another xTR, and to add the subscribing subnetwork to the mapping database for an extranet subnetwork.

10. One or more non-transitory computer-readable mediums having stored thereon executable instructions to instruct a hardware platform to:
communicatively couple to a LISP-enabled network;
provision a mapping database;
provision an extranet policy table; and
provide a shared subnetwork mapping engine (SSME) to:
receive a map request from a first endpoint serviced by a first tunneling router (xTR), the first endpoint on a first subnetwork, the map request for a second endpoint;
determine that the second endpoint is not a member of the first subnetwork based on the mapping database;
query the extranet policy table to identify a second subnetwork that the first subnetwork subscribes to, and to determine that the second endpoint is a member of the second subnetwork; and
provide to the first subnetwork a routing locator (RLOC) of an xTR servicing the second endpoint.

11. The one or more non-transitory computer-readable mediums of claim 10, wherein the second subnetwork is an extranet.

12. The one or more non-transitory computer-readable mediums of claim 10, wherein the first subnetwork is a consumer segment, and the second subnetwork is a provider segment.

13. The one or more non-transitory computer-readable mediums of claim 10, wherein the SSME is to provide to the first subnetwork the RLOC of the xTR servicing the second endpoint by providing an instance identifier (IID).

14. The one or more non-transitory computer-readable mediums of claim 10, wherein the SSME is to provide multicast semantics comprises receiving from the first endpoint a registration of interest for a multicast event from the second subnetwork, receiving from a third endpoint a registration of interest for the multicast event from the second subnetwork, identifying the first endpoint and third endpoint as listeners for the multicast event via the extranet policy table, and providing to the second subnetwork RLOCs for the first endpoint and third endpoint.

15. The one or more non-transitory computer-readable mediums of claim 10, wherein the SSME is further to send a copy of the extranet policy table to the first xTR.

16. The one or more non-transitory computer-readable mediums of claim 10, wherein the SSME is further configured to receive an extranet subnetwork registration from the first xTR.

17. The one or more non-transitory computer-readable mediums of claim 16, wherein the SSME is further configured to receive a registration for a subscribing subnetwork from another xTR, and to add the subscribing subnetwork to the mapping database for an extranet subnetwork.

18. A Location/Identifier Separation Protocol (LISP) tunneling router (xTR), comprising:
a processor; and
an xTR routing engine executed by the processor and configured to:
communicatively couple to a consumer subnetwork; and
register the consumer subnetwork to a mapping server with a consumer subnetwork flag.

19. The LISP xTR of claim 18, wherein the xTR routing engine is further configured to:
communicatively couple to a provider subnetwork; and
register the provider subnetwork to the mapping server with a provider subnetwork flag.

20. The LISP xTR of claim 18, wherein the xTR routing engine is further configured to:
receive from the mapping server a copy of an extranet policy table for mapping between the consumer subnetwork and a provider subnetwork.

* * * * *